July 1, 1969   H. J. TINMAN   3,452,456
ILLUMINATED EDUCATIONAL DEVICE
Filed Aug. 3, 1967
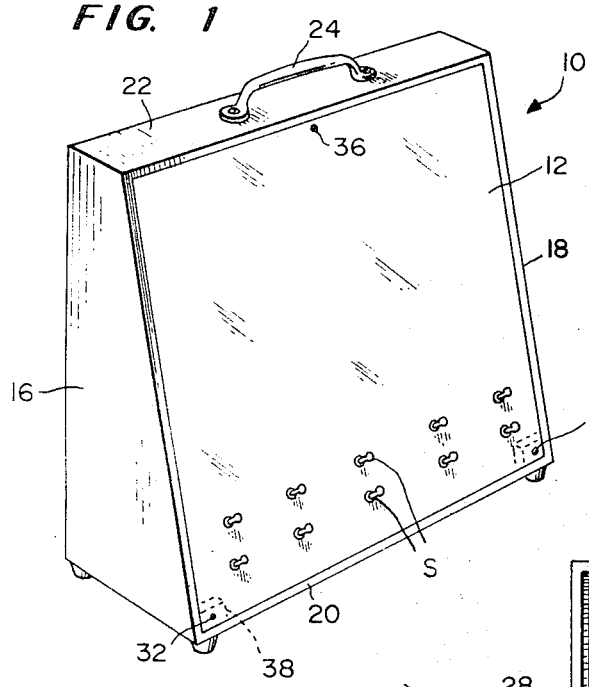
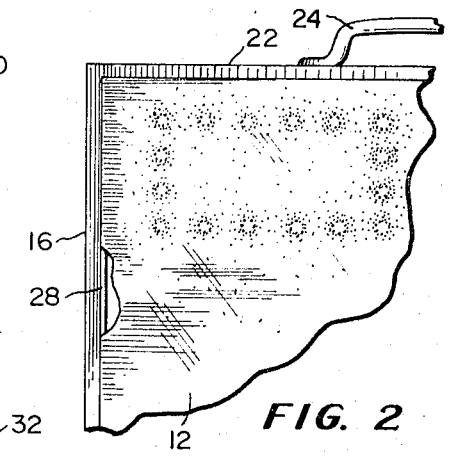
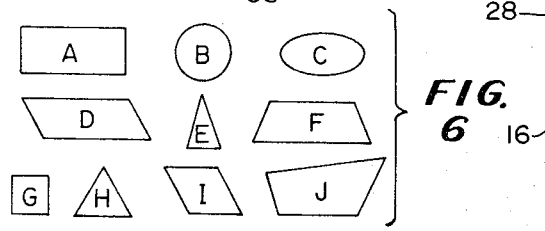
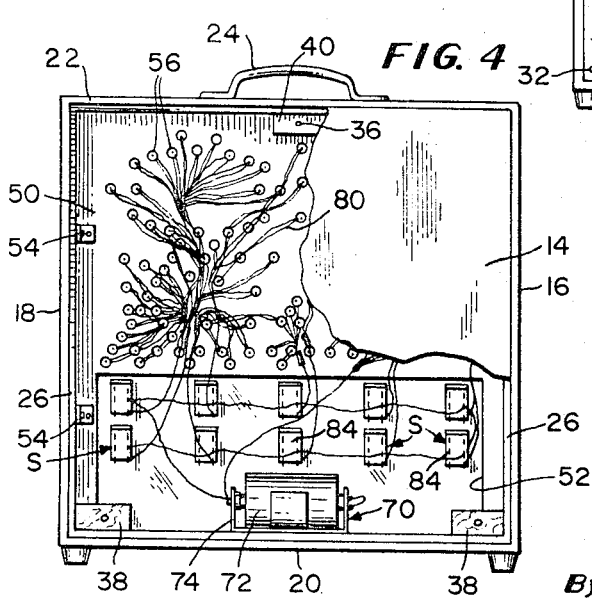
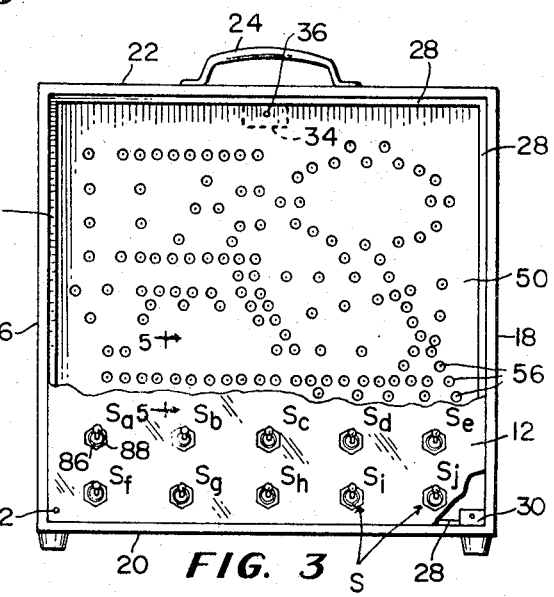
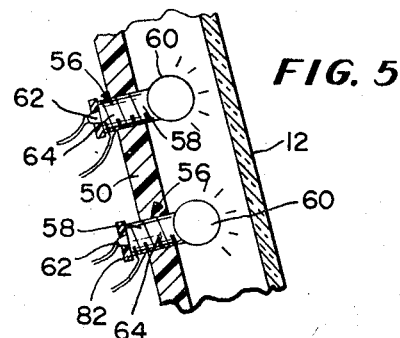
INVENTOR
HUGH J. TINMAN
By *Norman Gerlach*
Attorney

United States Patent Office 3,452,456
Patented July 1, 1969

3,452,456
ILLUMINATED EDUCATIONAL DEVICE
Hugh J. Tinman, Rte. 2, Box 79,
Lockport, Ill. 60441
Filed Aug. 3, 1967, Ser. No. 658,249
Int. Cl. G09b 23/04
U.S. Cl. 35—34                                   1 Claim

ABSTRACT OF THE DISCLOSURE

An educational device wherein various geometrical outlines become selectively illuminated on a display panel when corresponding circuits are closed under the control of respective switches.

---

The present invention relates to an educational device which is designed primarily for use in an elementary school, a kindergarten or the like for teaching pupils the rudiments of geometry by the selective presentation of illuminated shapes, the latter representing various fundamental geometrical configurations such as the square, the circle, the parallelogram, and the triangle.

In general, the invention contemplates the use of a translucent display panel behind which there are arranged separate series of small electric lamps which, when selectively illuminated, may be caused to portray the outline of the desired geometrical shapes. The various lamps are disposed in respective electrical circuits, each under the control of a conveniently accessible energizing switch when, when manually closed, causes energization of its associated circuit and consequent illumination of the lamps in such circuit, thereby giving a visual representation of the selected geometrical shape or configuration.

The embodiment of the invention which is selected for illustration or disclosure herein is a commercially practicable one wherein all the necessary components are embodied in a self-contained or unitary box-like structure which is of generally truncated pyramidal design and within which there is disposed a source of energizing current for the various series of lamps. The front wall of the box-like structure constitutes the aforementioned translucent display panel, and immediately behind such panel there is disposed a mounting panel which serves to support the various lamps so that, when they are illuminated, they will be visible through the display panel. The upper region of the display panel is reserved for display purposes while the lower region thereof serves as a mounting support for the various control switches, such switches being so mounted on the panel that their control knobs project forwardly of the display panel and are, therefore, readily accessible. The box-like structure also encloses the necessary wiring whereby the energizing source is operatively and electrically connected to the various lamp circuits. Preferably, the energizing source is in the form of a battery or a battery pack although it is within the purview of the present invention to employ a step-down transformer, in which case a suitable lead-in connection will be provided so that the transformer may be electrically connected to an electrical outlet in associated relation with a commercial power line. Irrespective, however, of the particular source of energizing current which is employed for lamp illumination, the essential features of the invention remain the same. The provision of an educational device of the aforementioned character constitutes the principal object of this invention.

The provision of an educational device which is extremely compact in its construction; one which comprises commercially available inexpensive components and, therefore, may be manufactured at a low cost; one which is capable of ease of assembly and dismantlement and in which there may be ready inspection, replacement, and repair of parts; one which is simple in its operation and requires no particular skill for its manipulation; one which is reasonably rugged and durable so that it will withstand rough usage; one which is devoid of relay mechanism and otherwise is possessed of no internal moving parts so that it is unlikely to get out of order; and one which is attractive in its appearance and pleasing in its design, are further desirable features which have been borne in mind in the production and development of the present invention.

Other objects and the various advantages and characteristics of the present invention, not at this time enumerated, will readily suggest themselves as the nature of the invention is better understood from a consideration of the following detailed specification.

In the accompanying single sheet of drawings forming a part of this specification, one operative embodiment of the invention is shown.

In these drawings:

FIG. 1 is a perspective view of an educational device embodying the principles of the present invention;

FIG. 2 is a fragmentary front elevational view of a portion of the device, illustrating schematically the illumination of one of the geometrical shapes or configurations;

FIG. 3 is a front elevational view of the device, a portion of the front translucent display panel being broken away in order more clearly to reveal the particular nature of the invention;

FIG. 4 is a rear view of the device, a portion of the rear access panel being broken away for clarity of illustration and understanding;

FIG. 5 is an enlarged sectional view on the line 5—5 of FIG. 3; and

FIG. 6 is a diagrammatic view, illustrating schematically the nature and relative positional relationship of the various geometrical shapes or configurations which are capable of being portrayed by the device.

Referring now to the drawings in detail and in particular to FIG. 1, an educational device which is constructed according to the principles of the present invention is designated in its entirety by the reference numeral 10 and comprises a generally frusto-pyramidal box-like structure having a substantially square, upwardly and rearwardly inclined front wall 12 which, as will be described in greater detail presently, consitutes a translucent display panel. The structure also has or embodies a substantially square vertical rear wall 14 in the nature of an access panel; vertical, spaced apart side walls 16 and 18 of trapezium outline; a wide horizontal rectangular bottom wall 20; and a narrow horizontal rectangular top wall 22, the latter being provided with a central carrying handle 24. The manner of assembly of the six walls just described may be varied as desired within the realm of known container-assembly operations, it being found expedient in the present instance to rabbet the rear edges of the top, bottom and side walls as indicated at 26 in order to accommodate the edges of the rear wall 14, and similarly to rabbet the front edges of said top, bottom and side walls as indicated at 28 in order to accommodate the edges of the front wall 12 of the box-like structure. As shown in FIG. 3, anchor blocks 30 are secured to the bottom wall 20 at the front lower corners of said box-like structure and are adapted to receive therein screws 32 (see FIG. 1) by means of which the lower edge of the display panel 12 is held in position within the rabbet groove 28. A similar anchor block 34 is secured to the top wall 22 at the medial region of the front marginal portion thereof and receives a screw 36 by means of which the upper edge of the front wall 12 is held in said rabbet groove 28. A pair of anchor blocks 38 on the bottom wall 20 and a single anchor block 40 on the top wall 22 serve in connection with certain screws (not shown but similar to the screws 32 and 36) to hold the rear wall 14 in position.

Referring now to FIGS. 4 and 5, a partition-like upwardly and rearwardly inclined rectangular mounting panel 50 is disposed within the box-like structure a slight distance behind the front wall 12 and extends parallel to the latter. The lower portion of this mounting panel 50 is cut away to provide a rectangular clearance area 52 for a series of hereinafter described control switches, the nature and function of which will be set forth presently. The mounting panel 50 may be held in its operative position in any suitable manner as, for example, by anchor bracket and screw assemblies 54 which are suitably mounted on the inner surfaces of the side walls 16 and 18.

Positioned on the mounting panel 50 at perdetermined points thereon are small electric lamps 56 of conventional construction or design, each lamp including the usual threaded metallic base or shank 58 (see FIG. 5) and a glass filament enclosure or bulb 60. As is conventional, the metal shank 58 of each lamp constitutes one electrical terminal of the lamp and the other terminal is established by a rearwardly protruding solder-tipped stem part 62. The various lamps 56 are mounted on the mounting panel 50 by pushing their shanks rearwardly through circular holes 64 in the panel, the diameter of each hole being slightly less than the over-all diameter of the associated metal shank 58 to the end that the lamps are frictionally held in position on the mounting panel 50 with the bulbs 60 facing in the direction of the front wall 12. The length of the shanks 58 is greater than the thickness of the mounting panel 50 so that when the lamps 56 are in their properly mounted position on the panel, the rear ends of said shanks with the solder-tipped stem parts 62 protrude rearwardly through the mounting panel a sufficient distance to enable soldering operations to be performed on said stem parts without removing the lamps from the mounting panel.

The various lamps 56 are so positioned on the mounting panel 50 that the bulb parts 60 thereof lie on the outlines of a plurality of geometric figures, shapes, designs, patterns or other configurations which may be selected for instructional purposes. The particular configurations which have been selected for illustration herein are schematically illustrated in FIG. 6 by straight-line patterns which have been labelled A, B, C, D, E, F, G, H, I and J, respectively, and which may, if desired, individually asume different locations on the mounting panel 50, but which, because of their relatively large size, overlap one another. The pattern A is a rectangle; the pattern B is a circle; the pattern C is an ellipse; the pattern D is a parallelogram; the pattern E is an isosceles triangle; the pattern F is a trapezoid; the pattern G is a square; the pattern H is an equilateral parallelogram; and the pattern J is a rhombus or equilateral parallelogram; and the pattern J is a trapezium. Numerous other geometrical configurations or patterns are contemplated within the purview of the present invention, as also are letter configurations or the configurations of numbers or special symbols. Irrespective, however, of the particular patterns which are formed on the mounting panel 50, the esential features of the invention are at all times preserved.

In order to energize the various electric lamps 56, a battery pack 70 including two conventional one and one-half volt dry cell batteries 72 and also a mouting bracket 74 for the batteries is suitably mounted on the bottom wall 20 of the box-like structure. The batteries 72 are suitably wired to a series of control switches S which are individually labelled Sa, Sb, Sc, Sd, Se, Sf, Sg, Sh, Si and Sj and are appropriately mounted directly on the lower portion of the front wall 12. The ten switches, in the order named, serve respectively to control the illumination of various lamps 56 which fall on the outlines of the ten patterns of FIG. 6, likewise in the order named. Accordingly, suitable wiring such as is designated in its entirety by the reference numeral 80 in FIG. 4 is effected between the various lamps 56, the various aforementioned switches, and the battery pack 70 in order to render the desired selective control of the illumination of the various groups of series of lamps. No claim is made herein to any specific circuitry, it being sufficient to state for descriptive purposes herein that the lamps 56 of each geometrical outline or pattern may be electrically connected in series in a local circuit extending from the battery pack 70, through the associated switch S, the ten local circuits being, of course, potentially connected in parallel relationship with respect to the battery pack.

The manner in which electrical connections are made to the various electric lamps 56 is illustrated in FIG. 5. Such connections may conveniently be made by slipping small dielectric insulating rings or washers 82 over the solder-tipped stem parts 62 of the lamps in order to shield the metallic shanks 58 from any possible overlap of solder during the soldering operations wherein the metallic shanks and the stem parts are individually soldered to respective conductor wires. After the soldering operations have been completed, the insulating washers will be captured in place and remain in the installation.

The various switches S are preferably commercially available six-terminal, double pole, double throw switches having switch casing 84 (see FIG. 4) from which there project forwardly threaded tubular stems 86 (see FIG. 3). The stems 86 project completely through the front wall 12 and clamping nuts 88 are threadedly received on the stems and serve to clamp the switch casings 84 against the inner face or surface of the front wall. The switch casings are aligned with and project into the cut-away or clearance area 52 in the mounting panel 50.

The selected materials for the construction of the educational device 10 and the various components are all commercially available materials and components. Preferably, the top, bottom and side walls of the frusto-pyramidal structure are formed of wood, either natural or plywood. The mounting panel 50 and the rear wall or access panel 14 may be formed of fiberboard, it being essential that the former panel be of an insulating nature and also somewhat soft or resilient since the shanks of the various lamps 56 are hand-pressed therein as previously described. The front wall or display panel 12 may be formed of any suitable translucent sheet material such, for example, as frosted glass or a translucent plastic material.

In FIG. 2, the illumination of one of the geometric patterns or outlines of which the present educational device is capable of portraying is schematically illustrated. The particular pattern or outline is the rectangular pattern A in FIG. 6 and it will be understood that the switch labelled Sa will have been closed to attain such illumination. The various lamps 56 which fall upon this rectangular pattern or outline may readily be visualized in FIG. 4, as may also the lamps which fall on any of the other patterns or outlines which are schematically portrayed or illustrated in FIG. 6. It will be observed that in the interests of clear visibility of the various patterns or outlines, the involved areas are of such large size that many of the patterns or outlines overlap one another and, therefore, it is contemplated that only one illuminated outline shall be displayed at any given time.

The invention is not to be limited to the exact arrangement of parts shown in the accompanying drawings or described in this specification as various changes in the details of construction and in the involved electrical circuitry may be resorted to without departing from the spirit or scope of the invention. Therefore, only insofar as the invention is particularly pointed out in the accompanying claim is the same to be limited.

Having thus described the invention what I claim as new and desire to secure by Letters Patent is:

1. An educational device adapted for the selective visible representation of geometric outlines and comprising a generally frusto-pyramidal box-like structure having a square upwardly and rearwardly inclined translucent front wall which constitutes a display panel, a partition-like upwardly and rearwardly inclined rectangular mounting panel disposed within said box-like structure a slight distance behind and parallel to said display panel, the lower medial region of said mounting panel being formed with a rectangular clearance area therein, said mounting panel being formed of insulating material and having a series of lamp-positioning mounting holes therethrough, a series of electric lamps, one for each hole, each lamp including a filament-enclosing bulb, a shank projecting from said bulb, and a solder tipped stem projecting axially from said stem, said shank and stem constituting the electrical terminals of the lamp, each of said holes serving to receive therethrough the stem of one of the lamps with a tight frictional fit, said holes and lamps being arranged in groups each of which is representative of one of said geometric outlines in that the lamps associated therewith are disposed in spaced relationship and lie upon said outline so that when the lamps of said group are energized the outline becomes illuminated and intensely visible through said translucent display panel, a circuit-closing switch individual to the lamps of each group, all of the switches being mounted on said display panel and projecting rearwardly through said clearance area in the mounting panel, a plurality of conductors operatively and electrically connecting the various lamps and switches, certain of the conductors being soldered to the lamp shanks and others of said conductors being soldered to the solder-tipped stems of the lamps, and a dielectric washer telescopically received over each solder-tipped stem and serving to insulate the latter from the associated shank and to electrically separate the conductor which is soldered to the stem from the conductor which is soldered to the shank.

References Cited

UNITED STATES PATENTS 1,132,108  3/1915  Merk-Wirz.

FOREIGN PATENTS 245,492  1/1926  Great Britain.
989,134  4/1965  Great Britain.

EUGENE R. CAPOZIO, *Primary Examiner.*

WILLIAM H. GRIEB, *Assistant Examiner.*

U.S. Cl. X.R.

40—130